Figure 3:
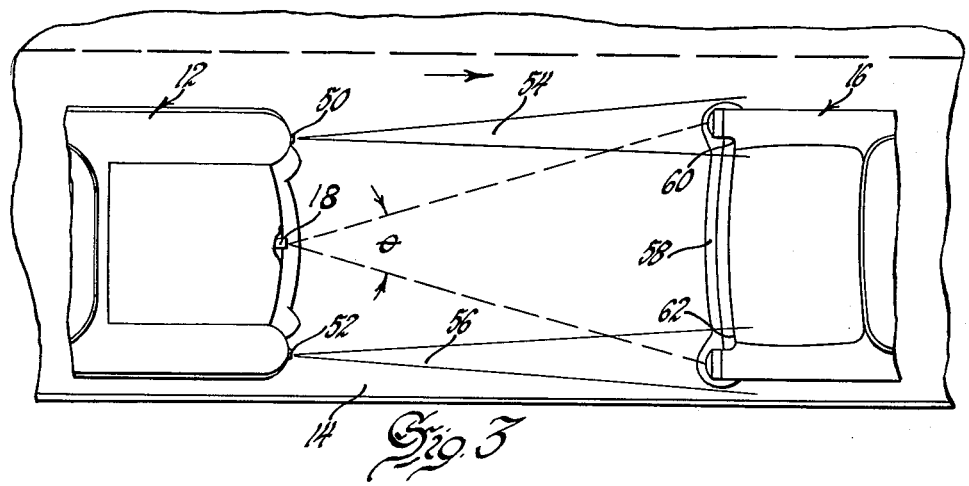

Dec. 5, 1961                   J. D. REID                   3,011,580
AUTOMATIC VEHICLE CONTROL SYSTEM
Filed Oct. 29, 1958                                                2 Sheets-Sheet 1
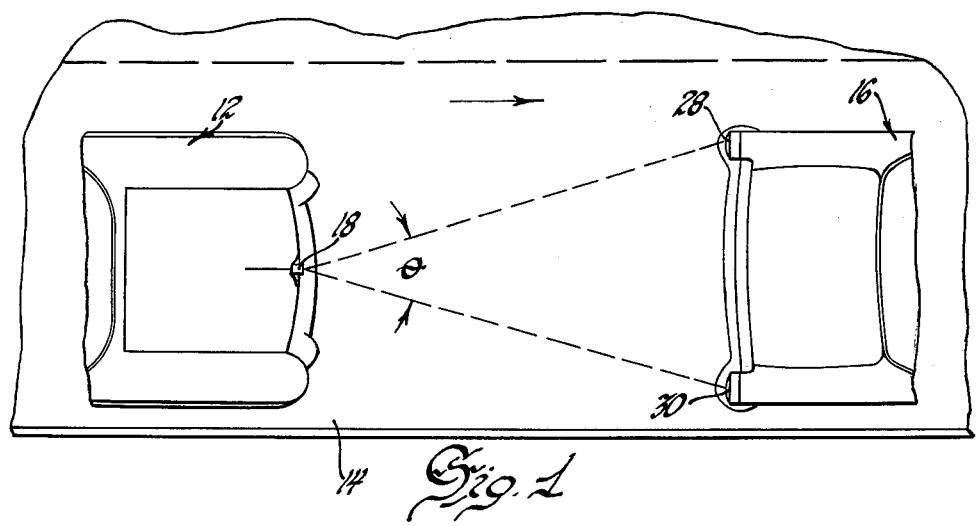
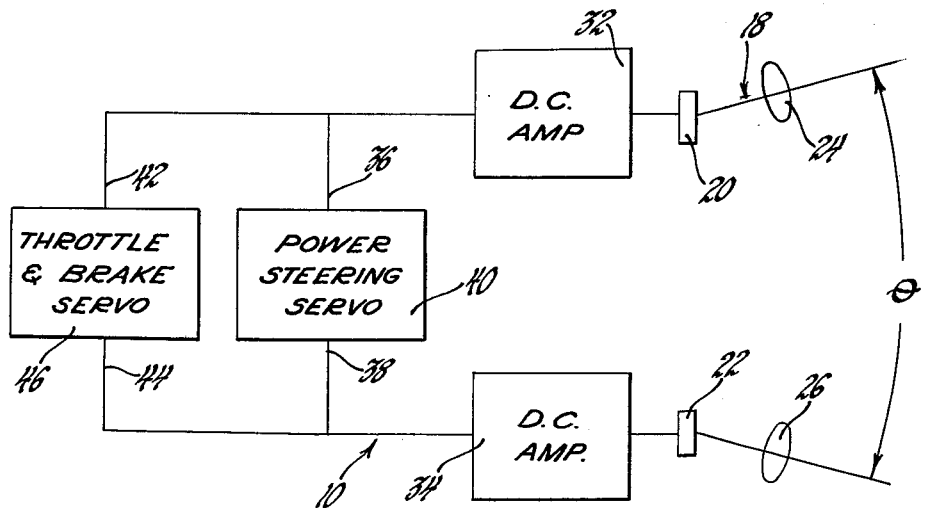
INVENTOR.
John D. Reid
BY
*signature*
ATTORNEY Dec. 5, 1961   J. D. REID   3,011,580
AUTOMATIC VEHICLE CONTROL SYSTEM
Filed Oct. 29, 1958   2 Sheets-Sheet 2

INVENTOR.
John D. Reid
BY
ATTORNEY

United States Patent Office 3,011,580
Patented Dec. 5, 1961

3,011,580
AUTOMATIC VEHICLE CONTROL SYSTEM
John D. Reid, Little Rock, Ark., assignor to General Motors Corporation, Detroit, Mich., a corporation of Delaware
Filed Oct. 29, 1958, Ser. No. 770,349
3 Claims. (Cl. 180—82.1)

The present invention relates to automotive vehicles and, more particularly, to means for automatically controlling the operation of such vehicles.

At the present time roadways for automotive vehicles consist of a plurality of lanes in which the vehicles travel. All vehicles in the same lane travel in the same direction and will normally be moving at generally similar speeds. However, the faster moving vehicles will overtake the slower vehicles. When the density of the traffic is heavy, there is a tendency for these faster moving vehicles to assume the speed of the slower vehicle if the speed difference is not excessive. As a result, the vehicles will form into groups and become closely spaced and travel at identical speeds. In the event the spacing between the vehicles is not adequate for the speed at which the vehicles are traveling, the grouping of the vehicles will be unstable and if one vehicle reduces its speed, one or more of the following vehicles will overrun the vehicle in front thereof before the following vehicles can safely reduce their speeds. Consequently, a "chain reaction" is set up that may result in a large number of vehicles being involved in a single accident. In order to avoid such accidents it is necessary for the drivers of the vehicles to maintain an adequate spacing between the vehicles and to be constantly on the alert for any unexpected variations in operating conditions. In the event the various drivers maintain an excessive distance between succeeding vehicles, the load carrying capacity of the roadway is unduly limited.

It is now proposed to overcome the foregoing difficulties by providing a system for automatically controlling each of the individual vehicles in a series. This will relieve the driver of the burden of controlling his vehicle and will provide a more constant reaction time for modifying the operation of the vehicle. As a result, the vehicles may be more closely spaced, thereby permitting greater utilization of the roadway and the number of accidents will be reduced. More particularly, this is accomplished by providing one or more pickups that are mounted on the front end of a trailing vehicle so as to sense radiations from the rear of a leading vehicle. These radiations are preferably in the invisible infrared region and may originate by means located on the leading vehicle or by means on the following vehicle that project concentrations of infrared onto the rear of the leading vehicle. The pickups on the trailing vehicle are adapted to sense these radiations and to provide an output signal indicative of the relative direction of the radiations. Automatic control means are interconnected with the pickups so as to be responsive to the output signals therefrom and are effective to adjust the speed and direction of the following vehicle in response thereto. Consequently, the trailing vehicle will be maintained a predetermined distance behind the leading vehicle and will be guided along the same path. As a result, the trailing vehicle may closely follow the leading vehicle without any help from the driver thereof. In addition, since the automatic control means will adjust the operation of the trailing vehicle with virtually no time delay, the safe spacing between the vehicles may be greatly reduced.

Figure 4:
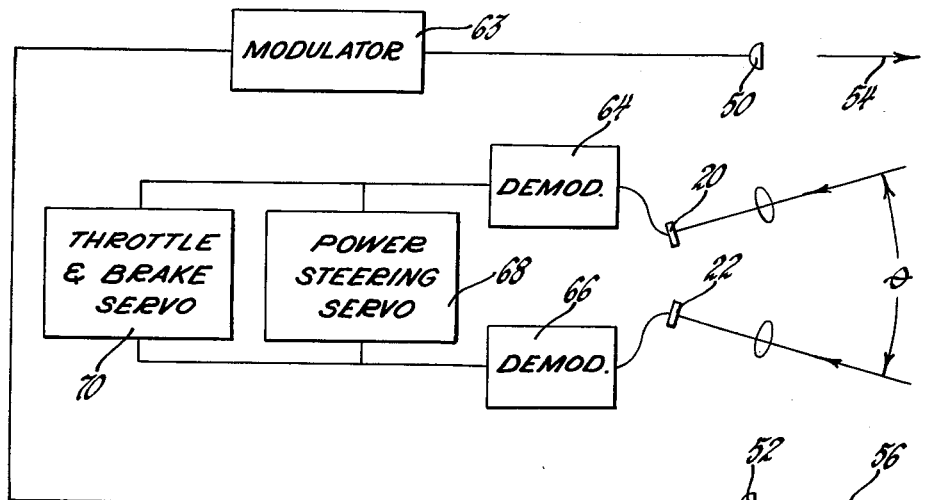

In the drawings:
FIGURE 1 is a plan view of a vehicle embodying the present invention, following another vehicle along a roadway.
FIGURE 2 is a block diagram of the control system used in the vehicle in FIGURE 1.
FIGURE 3 is a plan view of a vehicle embodying another form of the present invention, following another vehicle along a roadway.
FIGURE 4 is a block diagram of the control system used in the vehicle in FIGURE 3.

Referring to the drawings in more detail, the present invention is adapted to be embodied in a control system 10 for automatically guiding a trailing vehicle 12 along a roadway 14 in some predetermined spaced relation to a leading vehicle 16.

The control system 10 includes a pickup assembly 18 that is mounted on the front end of the trailing vehicle 12 for receiving radiation from a direction corresponding to the path the vehicle 12 is following. This pickup assembly 18 may be made responsive to any suitable form of radiation. However, it has been found that a pickup responsive to light can be made very inexpensively and still be simple and reliable in operation. Moreover, by employing invisible light in the infrared region, operation of the system 10 will not be objectionable to the occupants of the vehicle 12 or 16.

In the present instance the pickup assembly 18 comprises a pair of transducer units that are responsive to infrared radiation and particularly of the variety produced in large quantity by the taillights on present day automotive vehicles. Each of these transducers may be photocell units 20 and 22 or similar devices that produce electrical signals whenever they are subjected to infrared radiations. A separate lens 24 and 26, shielded aperture or other similar means is provided for each of the photocell units 20 and 22 to focus any radiations onto the sensitive portions of the units. This will make each unit 20 and 22 responsive to the direction of the source of radiations and, accordingly, the output therefrom will vary with the angular disposition of the source of radiation relative to the pickup assembly 18 on the trailing vehicle 12.

Although the sources of radiation may be of any desired nature, in the present embodiment the transducer units 20 and 22 are particularly adapted to sense the infrared energy radiated from the taillights 28 and 30 on the rear end of the leading vehicle 16. It has been found that the incandescent filaments of these taillights 28 and 30 produce considerable quantities of invisible infrared energy in addition to the visible light. The lenses 24 and 26 are arranged so that the photocell unit 22 on the right side of the trailing vehicle 12 will sense the infrared energy radiated from the right taillight 30 on the leading vehicle 16 and will produce an electrical output signal that will be a function of the angular location of the right taillight 30 relative to the center line of the trailing vehicle 12. Similarly, the left photocell unit 20 will sense the infrared radiations from the left taillight 28 and will produce an electrical output signal that will be a function of the angular location of the left taillight 28 relative to the center line. It may thus be seen that, if the center lines of the two vehicles 12 and 16 are coincident, the outputs from the two photocells 20 and 22 will be equal to each other and their amplitude will be a function of the angle θ subtended by the two taillights 28 and 30. In the event the two center lines are not coincident, the angle for one taillight will be larger than the angle for the other taillight and, consequently, the output from one photocell 20 or 22 will be greater than the other photocell 20 or 22.

The outputs from each of the photocell units 20 and 22 are connected to the inputs of D.C. amplifiers 32 and 34 that are effective to increase the output signals to more useful levels. The D.C. amplifiers 32 and 34 are, in turn, interconnected with a pair of inputs 36 and 38 to a power servo system 40 that is effective to actuate the steering system of the vehicle and thereby control the direction that the vehicle 12 travels. This servo system 40 is responsive to the difference between the two amplified signals and is effective to steer the vehicle 12 so as to maintain this difference at zero, i.e., the two outputs are equal.

It may thus be seen that when the trailing vehicle 12 is exactly centered behind the leading vehicle 16, the angles between the taillights 28 and 30 and the center line will be equal and therefore there will be no difference between the two amplified signals. Consequently, the trailing vehicle 12 will continue in a straight line and follow exactly behind the leading vehicle 16. However, in the event the trailing vehicle 12 is not properly centered behind the leading vehicle 16, the angles will no longer be equal. This will cause a difference in the amplified signals which will actuate the power servo 40 and turn the trailing vehicle 12 in the direction required to restore it to proper alignment with the leading vehicle 16.

In addition, the outputs of the D.C. amplifiers 32 and 34 are connected to the inputs 42 and 44 of a servo system 46 that is effective to regulate the speed of vehicle 12 by operating the engine throttle valve and/or the vehicle brakes. This servo 46 is adapted to be responsive to the amplitude of the signals from the D.C. amplifiers 32 and 34. The amplitude of these signals will represent the angle subtended by the taillights 28 and 30. If the distance between the taillights 28 and 30 is known, the distance between the vehicles 12 and 16 can be determined. It should be noted that, although the accuracy of this system would be improved by a standardizing of the spacing of the taillights 28 and 30, it has been found that the spacing has been sufficiently uniform to make the present system feasible.

The servo 46 is effective to actuate the throttle valve and/or vehicle brakes, as required, to maintain the amplitudes of the signals constant. If the spacing between the vehicles 12 and 16 is greater than the required amount, the angle will be small and the servo system 46 will increase the speed of vehicle 12 to restore the signals to the required amount. If the spacing is less than desired, the angle will be too large. Accordingly, the servo 46 will be effective to reduce the speed of the vehicle 12 by at least partially closing the throttle valve. If the subtended angle is greater than some critical amount, the vehicles 12 and 16 are dangerously close. Accordingly, a signal of some critical amount will be effective to actuate the vehicle brakes.

As an alternative to the foregoing embodiment, the embodiment of FIGURES 3 and 4 may be employed. In this embodiment a pickup assembly 18 similar to the foregoing one is mounted on the center of the trailing vehicle 12. However, instead of utilizing the taillights on the leading vehicle as a source of infrared, a pair of lamps 50 and 52 are employed for projecting beams 54 and 56 of infrared energy forwardly from the trailing vehicle 12. These beams 54 and 56 will strike the rear 58 of any leading vehicles 16 and produce concentrations 60 and 62 of infrared thereon. This energy will be reflected rearwardly toward the trailing vehicle 12 so as to be sensed by the pickup assembly 18. In order to prevent confusion and to eliminate ambiguities, it is desirable for the lamps 50 and 52 to be energized by modulating means 63. Consequently, the concentrations 60 and 62 of infrared will reflect energy that has a peculiar code that will be easily distinguishable from background infrared sources such as the taillights 28 and 30 on the leading vehicle 16.

Each of the photocells 20 and 22 in the pickup assembly 18 is interconnected to a demodulator 64 or 66 that will have an output which is entirely a function of the coded reflections received by the photocells. The outputs of the demodulators 64 and 66 are connected to a power steering servo 68 that is effective to guide the trailing vehicle 12 to maintain the two signals received by the photocells 20 and 22 equal. To prevent wandering or hunting of the following vehicle, it is desirable for the concentrations 60 and 62 to be located on the rear corners of the leading vehicle 16 and to extend slightly beyond the edges of the vehicle 16.

The demodulators 64 and 66 are also connected to a throttle and/or brake servo system 70 which is effective to regulate the speed of the vehicle 12 to maintain a predetermined spacing behind the leading vehicle 16.

Various changes and modifications of the embodiments of the invention described herein may be made by those skilled in the art without departing from the spirit and principles of the invention.

What is claimed is:

1. Means for causing a trailing vehicle to follow a leading vehicle comprising a pair of sources of light disposed on the rear of said leading vehicle a predetermined distance apart for radiating light to the rear thereof, light responsive means located on said trailing vehicle and having at least one zone of maximum sensitivity which is disposed in front of said trailing vehicle, said light responsive means having an output which is a function of the angle subtended by the spacing between said sources, control means mounted on said trailing vehicle and operatively interconnected with said light responsive means, said control means being effective to regulate the operation of said trailing vehicle whereby said subtended angle will be maintained a predetermined amount.

2. In a vehicle control system, a pair of radiating devices positioned at spaced points on the rear of each vehicle, a pair of directional pickups mounted on each vehicle and responsive to radiations from the front thereof, each of said pickups being adapted to produce an electrical output related to the magnitude of radiation received, said pickups being oriented such that each will receive a predetermined level of radiation when the angle subtended by said pair of radiating devices on a vehicle ahead is a predetermined amount and each will receive a lower level of radiation when the angle subtended is less than said predetermined amount, and vehicle speed control means on each vehicle connected to said pickups to receive said electrical outputs, said speed control means being adapted to control the speed of the vehicle in accordance with the magnitudes of said electrical outputs.

3. In a vehicle control system, a pair of radiating devices positioned at spaced points on the rear of each vehicle, a pair of directional pickups mounted on each vehicle and responsive to radiations from the front thereof, each of said pickups being adapted to produce an electrical output related to the magnitude of radiation received, said pickups being oriented such that each will receive a predetermined level of radiation when the angle subtended by said pair of radiating devices on the vehicle ahead is a predetermined amount, vehicle steering means on each vehicle connected to said pair of pickups to receive said electrical outputs, said steering means being adapted to control the vehicle wheels in accordance with the difference between the electrical outputs from said pickups, and vehicle speed control means on each vehicle connected to said pickups to receive said electrical outputs, said speed control means being adapted to actuate the brakes and throttle of the vehicle to control the speed thereof in accordance with the magnitudes of said electrical outputs.

References Cited in the file of this patent

UNITED STATES PATENTS

| | | |
|---|---|---|
| 2,109,475 | Fanning | Mar. 1, 1938 |
| 2,216,575 | Seinfeld et al. | Oct. 1, 1940 |
| 2,403,387 | McLennan | July 2, 1946 |
| 2,424,193 | Rost et al. | July 15, 1947 |
| 2,476,301 | Jenks | July 19, 1949 |
| 2,493,755 | Ferrill | Jan. 10, 1950 |
| 2,690,555 | Bradley | Sept. 28, 1954 |
| 2,699,834 | O'Brien | Jan. 18, 1955 |
| 2,750,583 | McCullough | June 12, 1956 |
| 2,762,913 | Jepson | Sept. 11, 1956 |
| 2,784,795 | Peiffer et al. | Mar. 12, 1957 |
| 2,804,160 | Rashid | Aug. 27, 1957 |
| 2,847,080 | Zworykin et al. | Aug. 12, 1958 |
| 2,896,089 | Wesch | July 21, 1959 |